United States Patent
Bücker

(10) Patent No.: US 8,699,245 B2
(45) Date of Patent: Apr. 15, 2014

(54) METHOD FOR INPUTTING POWER AND POWER INPUT SYSTEM

(75) Inventor: Andreas Bücker, Hasbergen (DE)

(73) Assignee: Kenersys GmbH, Munster (DE)

( * ) Notice: Subject to any disclaimer, the term of this patent is extended or adjusted under 35 U.S.C. 154(b) by 0 days.

(21) Appl. No.: 13/641,530

(22) PCT Filed: Apr. 15, 2011

(86) PCT No.: PCT/EP2011/056015
§ 371 (c)(1),
(2), (4) Date: Oct. 16, 2012

(87) PCT Pub. No.: WO2011/128438
PCT Pub. Date: Oct. 20, 2011

(65) Prior Publication Data
US 2013/0027992 A1    Jan. 31, 2013

(30) Foreign Application Priority Data

Apr. 16, 2010 (DE) .......................... 10 2010 015 440

(51) Int. Cl.
*H02M 5/45* (2006.01)
(52) U.S. Cl.
USPC ............................................................ 363/37
(58) Field of Classification Search
USPC ........................ 363/34, 37, 123; 323/205, 207
See application file for complete search history.

(56) References Cited

U.S. PATENT DOCUMENTS 4,581,573 A * 4/1986 Dobsa et al. .................. 323/356
4,719,557 A    1/1988 Forstbauer (Continued)

FOREIGN PATENT DOCUMENTS

DE    2318952    9/1974
DE    10019362   10/2001

(Continued)

OTHER PUBLICATIONS

Corcoles F., et al. "Three-phase transformer modelling for unbalanced conditions, Part 1: core modelling and introductory examples," Electric Power Applications, IET, vol. 2, No. 2, pp. 99-112 (2008).

(Continued)

*Primary Examiner* — Adolf Berhane
(74) *Attorney, Agent, or Firm* — Ballard Spahr LLP

(57) ABSTRACT

The invention relates to a method for inputting power into a multiphase alternating current grid by means of a transformer (18) which is electrically interconnected between the alternating current grid and a number of input phases (91, 92, (p3) corresponding to the number of grid phases (O1, 02, 03) of the grid, wherein at least one voltage characteristic (Ueffl, Uef~2, Ueff3) of one of the grid phases (O1, 02, 03) is determined, and an input of reactive currents occurs as a function of a previously determined deviation (AU1, AU2, AU3) of the voltage characteristic (Ueffl, Ueff2, Ueff3) of the at least one grid phase (O1, 02, 03) relative to a corresponding target voltage characteristic (Usoll). It is provided that the deviation of each one of the voltage characteristics (Ueffl, Ueff2, Ueff3) is determined, and the input of the reactive currents in case of deviations that are asymmetrical with respect to the symmetry of the target voltage characteristics is an asymmetrical input of the reactive current with respect to the respective input at the input phases (91, (02, (03). The invention further relates to a corresponding system (10) for inputting power into a multiphase alternating current grid.

9 Claims, 2 Drawing Sheets

(56) References Cited

U.S. PATENT DOCUMENTS

Figure 1:
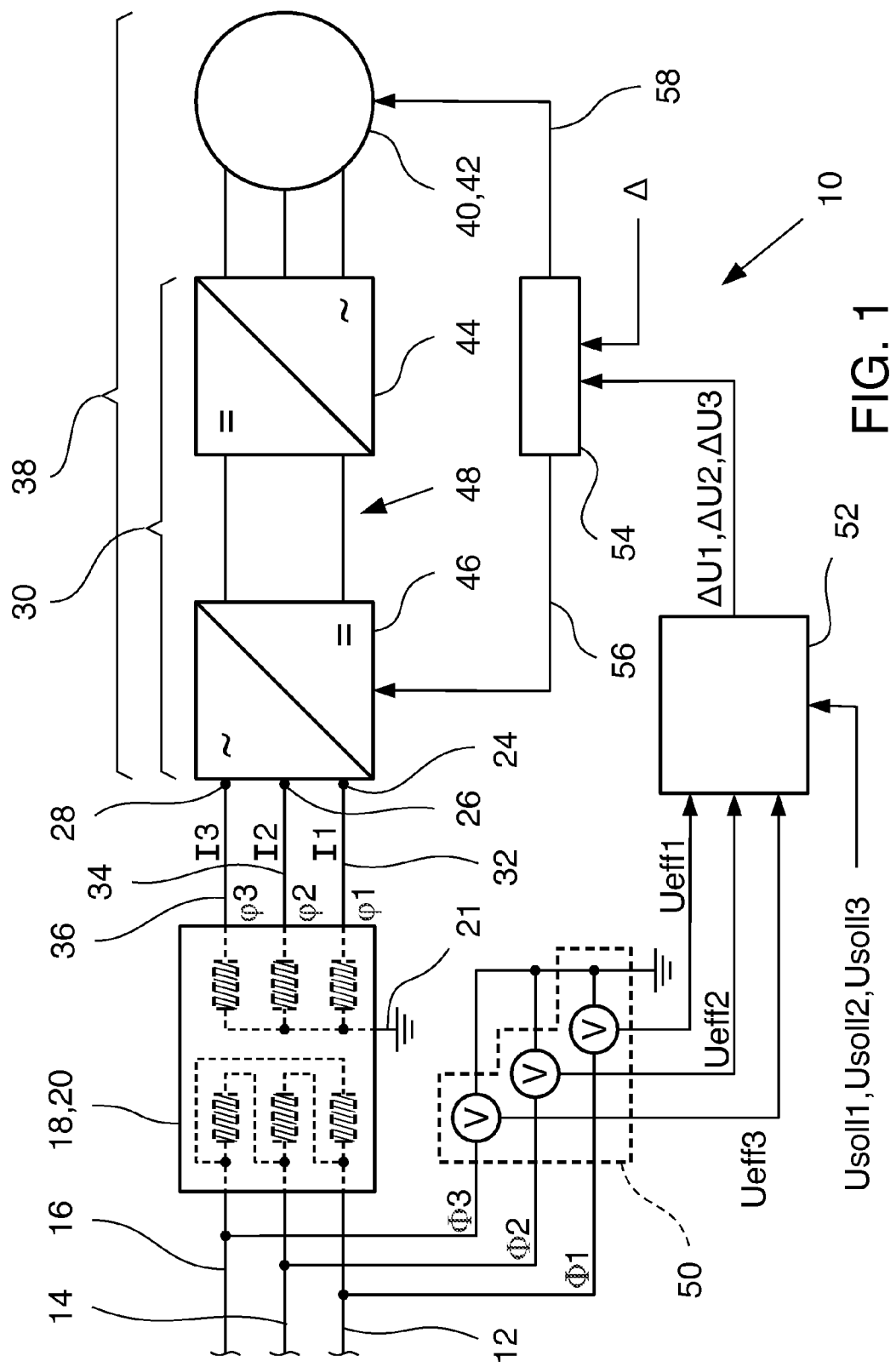
Figure 2A:
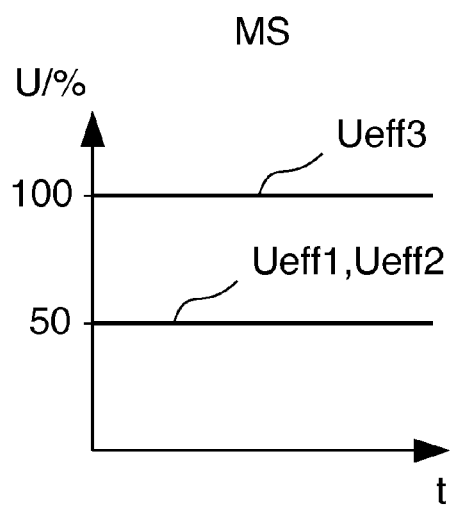
Figure 2B:
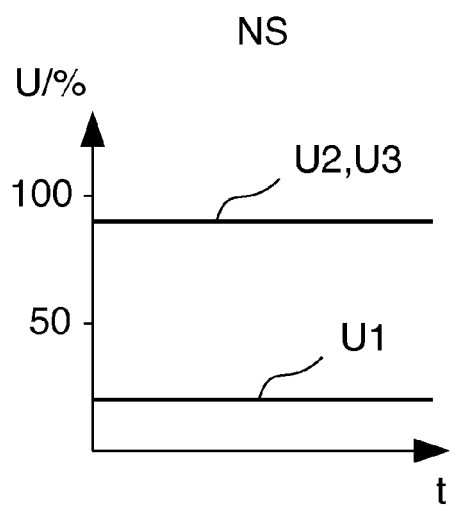
Figure 2C:
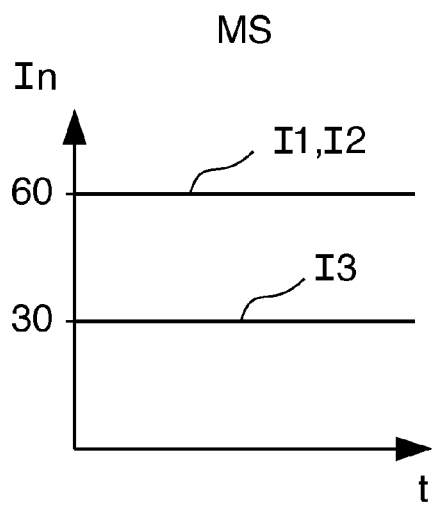
Figure 2D:
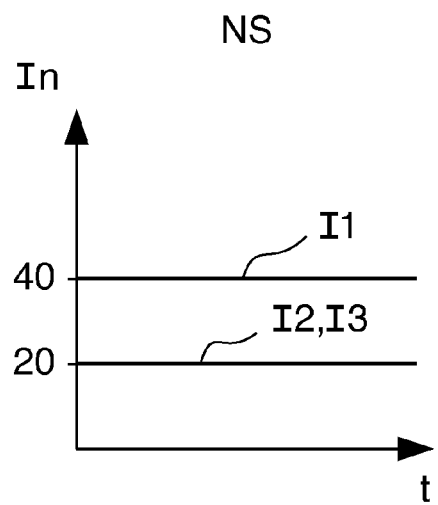

| | | | |
|---|---|---|---|
| 5,148,362 | A | 9/1992 | Braun |
| 7,439,714 | B2 * | 10/2008 | Llorente Gonzalez et al. . 322/24 |
| 7,535,737 | B2 * | 5/2009 | Mechi .............................. 363/37 |
| 7,800,926 | B2 * | 9/2010 | Benaboud et al. .............. 363/43 |
| 8,120,932 | B2 * | 2/2012 | Folts et al. ..................... 363/37 |
| 2008/0106099 | A1 | 5/2008 | Ichinose |
| 2013/0027992 | A1 | 1/2013 | Bücker |

FOREIGN PATENT DOCUMENTS

| | | |
|---|---|---|
| DE | 102010015440.7 | 4/2010 |
| DE | 102010015440.7 | 10/2011 |
| EP | 0208088 | 1/1987 |
| EP | 0471106 | 2/1992 |
| EP | 2011716210 | 4/2011 |
| EP | 2559130 | 2/2013 |
| GB | 1456575 | 11/1976 |
| WO | WO 2009/083445 | 7/2009 |
| WO | PCT/EP2011/056015 | 4/2011 |
| WO | WO 2011/128438 | 10/2011 |

OTHER PUBLICATIONS

International Search Report issued Nov. 7, 2011 by the International Searching Authority for application PCT/EP2011/056015 filed on Apr. 15, 2011 and published as WO 2011/128438 on Oct. 20, 2011 (Applicant—Kenersys GmbH//Inventor—Bücker) (6 pages).

Written Opinion issued Nov. 7, 2011 by the International Searching Authority for application PCT/EP2011/056015 filed on Apr. 15, 2011 and published as WO 2011/128438 on Oct. 20, 2011 (Applicant—Kenersys GmbH//Inventor—Bücker) (4 pages).

International Preliminary Report on Patentability issued Oct. 16, 2012 by the International Bureau for application PCT/EP2011/056015 filed on Apr. 15, 2011 and published as WO 2011/128438 on Oct. 20, 2011 (Applicant—Kenersys GmbH//Inventor—Bücker) (5 pages).

* cited by examiner

METHOD FOR INPUTTING POWER AND POWER INPUT SYSTEM

CROSS REFERENCE TO RELATED APPLICATIONS

The present application is a National Phase Application of International Application No. PCT/EP2011/056015, filed Apr. 15, 2011, which claims priority to German Patent Application No. 10 2010 015440.7, filed Apr. 16, 2010, which applications are incorporated herein fully by this reference.

The invention relates to a method for inputting power into a multiphase alternating current grid by means of a transformer which is electrically interconnected between the alternating current grid and a number of input phases corresponding to the number of grid phases of the grid, wherein at least one voltage characteristic of one of the grid phases is determined, and an input of reactive currents occurs as a function of a previously determined deviation of the voltage characteristic of the at least one grid phase relative to a corresponding target voltage characteristic.

The invention further relates to a corresponding system for inputting power into a multiphase alternating current grid.

Such a method and such a system are known, for example, in the case of the power input in a wind energy plant (WEP) which is normally operated parallel to the grid. If an error—that is a deviation of the voltage characteristic of at least one phase relative to a corresponding target voltage characteristic—occurs in the alternating current grid, then the wind energy plant should provide support for the grid in terms of the voltage shape. Such a support of the grid in the case of a multiphase alternating current grid occurs at this time in the form of a symmetrical reactive current input. For this purpose, the German Ordinance on System Services by Wind Energy Plants (SDLWindV) provides that, in three-phase alternating current grids, in the case of the occurrence of a significant voltage deviation, the energy generating means designed as a wind energy generating unit of the wind energy plant must support the voltage in the alternating current grid by adapting (increasing or decreasing) the reactive current. In the case of single- or double-pole deviations (errors), that is errors that are asymmetrical with respect to the grid phases, the wind energy generating units according to this ordinance must be technically capable of inputting a reactive current of at least 40% of the nominal current. The inputting of the reactive current must not compromise the requirements in terms of continuous operation in case of grid errors.

The alternating current grid consists of at least one medium voltage or high voltage grid (MV or HV grid). The corresponding grid error occurs in this grid and is transformed by means of the transformer into a low voltage grid associated with the energy generating means (LV grid). Independently of the connection of the transformer, that is regardless of whether it is a delta-star connection (Dy connection) or a star-star connection (Yy connection), the error is transmitted symmetrically in all three generator-side phases. The wind energy generating units of the wind energy plants therefore input a symmetrical three-pole reactive current into the grid, which as a rule can be regulated by adjustment.

The following difficulties arise in the process, and will be illustrated using a three-phase system. In the case of grid errors on one or two phases, that is to say errors which do not occur in all three phases of the three-phase grid, the three-phase voltage system (three-phase current system) is strongly distorted. For example, in a double-pole error of a system without ground contact on the grid side, two phases in the voltage are clearly lowered and a third phase remains nearly unchanged. When using a Dy transformer, two generator phases are slightly lowered, and a third phase is very strongly lowered, on the side of the energy generating unit, that is on the low voltage side (LV side). If one then inputs a three-phase reactive current (overexcited) as grid support, then the three voltages, each associated with one phase on the side of the energy generating unit (LV side), are raised equally, which may result in the two phases that have not been lowered strongly being switched off as a result of overvoltage (overvoltage power-off) and the third strongly lowered phase being raised less strongly.

When using a Yy transformer, a corresponding situation arises in the case of a corresponding error. If a three-phase reactive current is also input here as grid support, the "healthy" phase(s) increase(s) strongly, and a voltage cut-off can occur.

Therefore, the problem of the invention is to provide a method and a system for inputting power, which are easy to implement and which result in an improvement of the support properties.

The problem is solved according to the invention by the characteristics of the independent claims; advantageous embodiments of the invention are indicated in the dependent claims.

The above-mentioned problem is solved in the method according to the invention in that the deviation of each one of the voltage characteristics is determined, and the input of the reactive currents in case of deviations that are asymmetrical with respect to the symmetry of the target voltage characteristics is an asymmetrical input of the reactive currents with respect to each input at the input phases. The deviation can here be the result of the phase relationship between the voltage shape that is the basis of the voltage characteristic and the target voltage shape or of the amplitude ratio of the voltage shape that is the basis of the voltage characteristic to the target voltage shape. In general, the amplitude of the effective voltage for all the phases of the grid has the same value. Therefore, the deviation is in particular a deviation of the resulting effective voltage from the target effective voltage.

The multiphase alternating current grid is preferably a three-phase alternating current grid (rotating current grid). Here, the transformer is a star-star transformer (yy transformer) or a delta-star transformer (Dy transformer), for example. Here, the neutral point of the at least one star connection can be brought out or not brought out.

In particular, it is provided that the asymmetrical input of the reactive currents occurs only in the case of a deviation that exceeds a tolerance value (a tolerance threshold) $\Delta$. If a deviation of the at least one voltage characteristic from the target voltage characteristic of the corresponding grid phase, target voltage characteristic which is associated with said voltage characteristic, exceeds the tolerance value, the deviation indicates a so-called grid error. The tolerance value is thus an error tolerance, and the asymmetrical input of the reactive currents occurs at the time of the detection of a grid error determined by the error tolerance.

According to a preferred first alternative embodiment of the invention, it is provided that the determination of the voltage characteristics is a measurement of the voltages applied at the grid phases and a determination of the voltage characteristics from the respective voltage. The measurement occurs in the area of the transformer. For example, if the transformer is a transformer with brought out neutral point, then the voltages of each phase (respectively poles) of the grid are measured preferably with respect to this neutral point (as reference potential).

According to a preferred second alternative embodiment of the invention, it is provided that the determination of the voltage characteristic is a measurement of corresponding voltage values at the input phases and a determination of the associated voltage characteristic from the voltage values by means of a model of the transformer. The model is preferably a mathematical model. Such a determination of the voltage characteristic is preferred, for example, when using a transformer with neutral point not brought out.

In particular, it is provided that the target voltage characteristic is obtained at any time from the previously determined voltage characteristics. The target voltage characteristic can also be specified alternatively or additionally in other ways.

According to an additional preferred embodiment of the invention, it is provided that the input of the reactive currents occurs by means of an energy generating means with a generator and with a downstream inverter system, means which is connected to the transformer on the input side, wherein, after a deviation exceeding the tolerance value has been detected, an exciting current of the generator is reduced and the asymmetrical reactive current is input by means of the inverter system.

The invention further relates to a system for inputting power into a multiphase alternating current grid, with an energy generating means which comprises a generator and an inverter system downstream of the generator, with a transformer which is interconnected between the alternating current grid and a number of outputs of the inverter system corresponding to the number of grid phases, and with a device for determining at least one voltage characteristic of one of the grid phases and with a means for determining a deviation of at least one determined voltage characteristic relative to a corresponding target voltage characteristic and for controlling the inverter system in such a manner that an input of a reactive current occurs as a function of the previously determined deviation, wherein the means is a means for the determination of each voltage characteristic and controls the inverter in such a manner that the latter, in the case of deviations that are asymmetrical with respect to the symmetry of the target voltage shapes, inputs a reactive current which is asymmetrical with respect to the outputs. The system is in particular a system of a wind energy plant (WEP).

According to a preferred embodiment of the invention, it is provided that the inverter system comprises a generator-side inverter, a direct current intermediate circuit and a grid-side inverter with the outputs. Such inverter systems are known from wind energy plants.

According to a further preferred embodiment of the invention, it is provided that the system comprises a device for measuring the voltages applied to the grid phases. Alternatively, it is provided that the system comprises a device for measuring the voltage values applied at the outputs, and a model of the transformer for determining the associated voltage characteristic from the voltage values. The model is preferably a mathematical model which is implemented in the means for determining the deviation of each one of the voltage characteristics.

FIG. 1 shows a power input system according to a preferred embodiment of the invention, and FIGS. 2a-2d show diagrams in which grid-side as well as generator-side effective voltages Ueff and effective currents Ieff are plotted against time t.

FIG. 1 shows a system (power input system) 10 for inputting power into a three-phase alternating current grid of which only the connection lines 12, 14, 16 are shown. These connection lines 12, 14, 16 are associated with corresponding grid phases Φ1, Φ2, Φ3 of the alternating current grid and are connected to grid-side connections of a transformer 18. The transformer is configured as a delta-star transformer (Dy transformer) 20 with brought out neutral point 21 of the input-side star connection. To the input-side connections of the transformer 18, three outputs 24, 26, 28 of an inverter system 30 are connected in an electrically conducting manner by means of three lines 32, 34, 36, which are associated with the input phases φ1, φ2, φ3 corresponding to the grid phases. The inverter system 30 is part of an energy generating means 38 which also comprises, besides the inverter system 30, an electrical machine 42 configured as a generator 40. The inverter system 30 comprises a generator-side inverter 44, a grid-side inverter 46 with the outputs 24, 26, 28, and a direct current intermediate circuit 48 interconnected between the two inverters 44, 46.

The system further comprises a device 50 for determining three voltage characteristics Ueff1, Ueff2, Ueff3 associated with the grid phases Φ1, Φ2, Φ3, which apply said voltage characteristics Ueff1, Ueff2, Ueff3 to a means 52. This means 52 is a means for determining the deviations ΔU1, ΔU2, ΔU3 of the determined voltage characteristics relative to the corresponding target voltage characteristics Usoll1=Usoll2=Usoll3=Usoll, and for controlling the inverter system 30 in such a manner that an input of a reactive current occurs as a function of the previously determined deviations ΔU1, ΔU2, ΔU3. This control is a control of the grid-side inverter 46 by means of a control/regulation device 54 of the energy generating means 38, and in FIG. 1 it is indicated with the arrow 56. For this control, said control/regulation device 54 receives three signals describing the deviations ΔU1, ΔU2, ΔU3 from the means 52.

The resulting operation of the system 10 is as follows:

The device 50 determines all three voltage characteristics Ueff1, Ueff2, Ueff3 of the grid phases (Φ1, Φ2, Φ3) of the alternating current grid by measuring the voltages against the ground potential and it outputs them to the means 52. The means 52 determines the deviations ΔU1, ΔU2, ΔU3 of the voltage characteristics Ueff1, Ueff2, Ueff3 of the three grid phases Φ1, Φ2, Φ3 relative to the corresponding target voltage characteristics Usoll1, Usoll2, Usoll3. If the control/regulation means 54 detects that at least one of the deviations ΔU1, ΔU2, ΔU3 is a deviation that exceeds the tolerance value Δ, and that the deviations are asymmetrical with respect to the symmetry of the target voltage characteristics, then the control/regulation means 54 reduces an exciting current of the generator 40 (arrow 58) and controls the grid-side inverter 46 of the inverter system 30 in such a manner that the input of reactive currents I1, I2, I3 is an input of the reactive currents I1, I2, I3 which is asymmetrical relative to the respective input at the input phases φ1, φ2, φ3, in order to reduce the asymmetry of the deviations ΔU1, ΔU2, ΔU3 of the voltage characteristics Ueff1, Ueff2, Ueff3, that is to say of the grid errors.

In case of deviations of the voltage(s) from symmetrical voltage values up to a threshold, the active power can continue to be input, and the exciting current is decreased in accordance with the deviation. If the deviations are greater than or equal to the threshold, a reduction of the exciting current to zero occurs in the end.

FIGS. 2a-2d show graphs in which grid-side as well as generator-side effective voltages Ueff and effective currents Ieff are plotted against time t. These graphs illustrate a corresponding example of the operation:

If a grid error occurs in the alternating current grid between the first and the second grid phase (Φ1, Φ2), the following effective voltages result, for example, Ueff1=50% Usoll, Ueff2=50% Usoll and Ueff3=100% Usoll (for example, at the mean voltage side). Thus, the deviations are asymmetrical with respect to the symmetry of the target voltage characteristics Usoll. On the input side (for example, on the low voltage side), U2=90% Un, U3=90% Un and U1=20% Un. After error detection, the exciting current in the extreme case is reduced to zero in order to "de-excite" the generator 40 and no longer supply the intermediate circuit 48 with energy.

In order to stabilize the voltages of the alternating current grid (that is to say for grid support), the grid-side inverter 46 in the input phase φ3 inputs a reactive current of up to 100% Imax, so that, in the input phases φ1, φ2 in each case half the current (in each case 50% Imax) flows back with opposite phase. The asymmetrically input reactive current generates at the grid impedance a voltage drop and therefore has a supporting effect with respect to the grid voltage. In the example in FIGS. 2c and 2d, 40% In in phase 1 (φ1) and 20% In in both phase 2 and phase 3 (φ2, φ3) are input.

This results in the following power input in the case of the alternating current grid, for example, at the mean voltage side: I1=60% In, I2=60% In and I3=0% In, and the following power input on the input side, for example, on the low voltage side: I1=40% In, I2=20% In and I3=20% In.

In general, the following alternate solutions result:
1. Use of a zero sequence system:

If on the grid side and on the input side a Yy transformer with neutral point (star point) brought out is used, then the star point, even more advantageously, is grounded in order to obtain in this manner a fixed reference value, and a nearly single-phase current can be input, which is closed via the zero sequence system. The regulation of the current, of the amplitude, and of the phase relationship must occur in such a manner on the grid side that the resulting voltage is optimally supported to the extent possible, and symmetrically to the extent possible. For this purpose, the voltage is measured with the device on the grid side, and is applied to the means 52, 54 (controller).

Usually, in three-phase systems, the field-oriented regulation with the Park and Clarke transformation is used, which cannot be used here, since it relates to three-phase systems.

The reactive current is supplied by the grid-side inverter 46; the electrical machine 42, synchronous machine electrically excited or permanently excited, and the asynchronous machine with double input do not contribute to the asymmetrical reactive current support.

In an alternative, three independent single-phase frequency inverters with a single-phase grid filter and a higher-level three-phase grid regulation are implemented. Alternate currents at grid frequency are input. The zero sequence system is closed via the generator which should be configured in the star connection and which is optionally grounded. Alternatively to the three single-phase power inverters, the three-phase inverter 46 can also be used.

2. Use of a Yy transformer with neutral point not brought out:

If a transformer with the vector group Yy is used and the star point is not brought out, then the three conductor currents are closed at the star point. The voltage is measured on the grid side with the device 50 (sensor) and applied to the controllers 52, 54 as control parameters. Alternatively, a model of the transformer 18 can also be stored in the controller 54, and the operation can be carried out with the measured voltages on the generator side. The three-phase currents are now input with their phase shift and amplitude shift regulated in such a manner that the result is, on the grid side, a grid support, as symmetrical as possible a grid with nominal voltage.

3. Use of a Dy transformer (as in FIG. 1):

When a transformer with vector group Dy is used, one gets, with a brought out neutral point 21 of the transformer 18 and of the generator 42 used, a similar picture as under point 1, where here, in particular, the phase and amplitude shifts of the Dy transformer 20 must be taken into consideration. Alternatively, the mean voltage in the grid is measured or the low voltage measured on the input side and converted with the transformer model is used as control variable.

4. If a Dy transformer with neutral point not brought out is used, the same statement made under point 2 applies.

The invention claimed is:

1. Method for inputting power into a multiphase alternating current grid by means of a transformer (18) which is electrically interconnected between the alternating current grid and a number of input phases (φ1, φ2, φ3) corresponding to the number of grid phases (Φ1, Φ2, Φ3) of the grid, wherein at least one voltage characteristic (Ueff1, Ueff2, Ueff3) of one of the grid phases (Φ1, Φ2, Φ3) is determined, and an input of reactive currents occurs as a function of a previously determined deviation (ΔU1, ΔU2, ΔU3) of the voltage characteristic (Ueff1, Ueff2, Ueff3) of the at least one grid phase relative to a corresponding target voltage characteristic (Usoll), wherein the input of the reactive currents occurs by means of an energy generating means (38) with a generator (40) and with a downstream inverter system (30), means (38) which is connected to the transformer (18) on the input side; wherein the deviation (ΔU1, ΔU2, ΔU3) of each one of the voltage characteristics (Ueff1, Ueff2, Ueff3) is determined, and the input of the reactive currents in case of deviations that are asymmetrical with respect to the symmetry of the target voltage characteristics (Usoll) is an asymmetrical input of the reactive currents with respect to the respective input at the input phases (φ1, φ2, φ3), wherein this asymmetrical input occurs only in the case of at least one deviation (ΔU1, ΔU2, ΔU3) that exceeds a tolerance value (Δ); and after the detection of a deviation that exceeds the tolerance value, an exciting current of the generator (40) is reduced, and by means of the inverter system (30), the asymmetrical reactive current is input.

2. Method according to claim 1, wherein the determination of the voltage characteristics consists of a measurement of the voltages applied at the grid phases and a determination of the voltage characteristics from the respective voltage.

3. Method according to claim 1, wherein the determination of the voltage characteristic consists of a measurement of corresponding voltage values at the input phases and a determination of the associated voltage characteristics from the voltage values by means of a model of the transformer.

4. Method according to claim 1, wherein, the target voltage characteristic results at any time from the previously determined voltage characteristics.

5. System (10) for inputting power into a multiphase alternating current grid, with an energy generating means (38) which comprises a generator (40) and an inverter system (30) downstream of the generator (40), with a transformer (18) which is interconnected between the alternating current grid and a number of outputs (24, 26, 28) of the inverter system (30) corresponding to the number of grid phases (Φ1, Φ2, Φ3), and with a device (50) for determining at least one voltage characteristic (Ueff1, Ueff2, Ueff3) of one of the grid phases (Φ1, Φ2, Φ3) and with a means (52) for determining a deviation (ΔU1, ΔU2, ΔU3) of at least one determined voltage characteristic (Ueff1, Ueff2, Ueff3) relative to a corresponding target voltage characteristic (Usoll) and for controlling the inverter system (30) in such a manner that an input of a reactive current occurs as a function of the previously determined-deviation (ΔU1, ΔU2, ΔU3), wherein the means

(52) is appropriate for the determination of the deviation of each one of the voltage characteristics and controls the inverter (30) in such a manner that the latter, in the case of deviations that are asymmetrical with respect to the symmetry of the target voltage shapes, inputs a reactive current which is asymmetrical with respect to the outputs, wherein the control of the inverter (30) is a control by means of a control/regulation device (54) of the energy generating means, which control/regulation device reduces an exciting current of the generator (40) and inputs the asymmetrical reactive current by means of the inverter system (30) after the detection of a deviation that exceeds the tolerance value ($\Delta$).

6. System according to claim 5, wherein the inverter system (30) comprises a generator-side inverter (44), a direct current intermediate circuit (48), and a grid-side inverter (46) with the outputs (24, 26, 28).

7. System according to claim 5, wherein the device (50) measures the voltages applied at the grid phases and determines the voltage characteristics from the respective voltage.

8. System according to claim 5, wherein the device (50) measures the voltage values applied at the outputs (24, 26, 28) and wherein the system further comprises a model of the transformer (18) which model determines the associated voltage characteristics from the voltage values.

9. System according to claim 6, wherein the control of the inverter (30) is a control of the grid-side inverter (46) by means of the control/regulation device (54).

\* \* \* \* \*